(12) United States Patent
Kelsey

(10) Patent No.: US 7,058,884 B2
(45) Date of Patent: Jun. 6, 2006

(54) STRUCTURES TO REPRESENT POORLY FORMED HTML DOCUMENTS

(75) Inventor: Julian Benjamin Kelsey, Eastwood (AU)

(73) Assignee: Canon Kabushiki Kaisha, Tokyo (JP)

( * ) Notice: Subject to any disclaimer, the term of this patent is extended or adjusted under 35 U.S.C. 154(b) by 684 days.

(21) Appl. No.: 09/737,589

(22) Filed: Dec. 18, 2000

(65) Prior Publication Data

US 2001/0054048 A1    Dec. 20, 2001

(30) Foreign Application Priority Data

Dec. 22, 1999   (AU) .................................. PQ4799

(51) Int. Cl.
*G06F 15/00* (2006.01)
(52) U.S. Cl. .................. 715/513; 715/517; 715/523
(58) Field of Classification Search ................ 715/500, 715/501.1, 513, 517, 523
See application file for complete search history.

(56) References Cited

U.S. PATENT DOCUMENTS

| 5,276,793 | A | * | 1/1994 | Borgendale et al. ........ 715/513 |
| 5,973,696 | A | | 10/1999 | Agranat et al. ............. 345/357 |
| 5,991,713 | A | | 11/1999 | Unger et al. ..................... 704/9 |
| 6,035,326 | A | * | 3/2000 | Miles et al. .................. 709/206 |
| 6,507,856 | B1 | * | 1/2003 | Chen et al. .................. 715/513 |
| 6,558,431 | B1 | * | 5/2003 | Lynch et al. ................. 715/513 |
| 6,675,354 | B1 | * | 1/2004 | Claussen et al. ............. 715/513 |
| 2001/0018697 | A1 | * | 8/2001 | Kunitake et al. ........... 707/517 |
| 2002/0073119 | A1 | * | 6/2002 | Richard ....................... 707/513 |

FOREIGN PATENT DOCUMENTS

| EP | 790581 | 8/1997 |
| WO | WO 97/33437 | 9/1997 |
| WO | WO 98/008168 | 2/1998 |
| WO | WO 99/53469 | 10/1999 |

OTHER PUBLICATIONS

Cormen et al., Introduction to Algorithms, The Massachusetts Institute of Technology, Nineteenth Printing, 1997 (250-252 et seq.).*
Michael Fourman and the University of Edinburgh, 22 Balanced Search Trees, © 1994-2004 (available at http://homepages.inf.ed.ac.uk/mfourman/teaching/mlCourse/notes/L22.html).*
Scott Robert Ladd, C++ Templates and Tools, 2nd Ed., M&T Books, Copyright © 1996, pp. 187-215.*

* cited by examiner

*Primary Examiner*—William Bashore
*Assistant Examiner*—Paul Nguyen-Ba
(74) *Attorney, Agent, or Firm*—Fitzpatrick, Cella, Harper & Scinto

(57) ABSTRACT

Disclosed is a method of restructuring an input HTML document to comply with strict HTML. An input HTML document is linearly traversed to create a hierarchical tree structure representation (FIGS. 2A–2F), the traversal maintaining a current insertion point (206, 210) for elements within the tree structure representation. During the traversal, elements (208) of the input HTML document that violate strict HTML are identified. Each element is then processed individually, initially by retracing the tree structure representation from the current insertion point to identify an further insertion point from which the identified element can depend, the retracing comprising noting each parent element of the identified element passed during said retracing. Then, at the further insertion point, new elements (218) are created in the tree structure representation to correspond to those parent elements passed during the retracing, the new elements being created in reverse chronological order to that encountered during the retracing. The identified element (208) is then append to a terminal one of the new elements. The tree structure representation can then be converted into an output HTML document.

21 Claims, 7 Drawing Sheets

STRUCTURES TO REPRESENT POORLY FORMED HTML DOCUMENTS

This patent specification contains material that is subject to copyright protection. The copyright owner has no objection to the reproduction of this patent specification or related materials from associated patent office files for the purposes of review, but otherwise reserves all copyright whatsoever.

TECHNICAL FIELD OF THE INVENTION

The present invention relates to structuring within electronic documents and, in particular, to structuring forms within computer languages such as mark-up languages and documents formed therefrom.

BACKGROUND

The field of computer coding covers many different coding and program schemes all of which incorporate certain rules that define the particular coding scheme and which generally must be adhered to by users of such schemes in order for results to be derived therefrom. For example, a person programming in the language Pascal must ensure their code corresponds the appropriate Pascal syntax in order for the Pascal program to operate. Where code does not comply, a "syntax error" will occur upon compilation of the program.

As opposed to programming in a highly structured language, more recently it has become common to alter or create documents using so called "mark-up languages" to provide a mechanism by which content in a document is presented in a particular environment, usually upon a display screen or printing device. One example of this is the Hypertext Mark-up Language (HTML) and another is the Extended Mark-up Language (XML). The purpose of such mark-up languages is to provide additional notation to content desired to be displayed or presented, so as to cause the content to be displayed or presented in fashion desired by the author.

The HTML document format pervades the Internet and the World Wide Web. In practice, documents structured with HTML mark-up are often in error in that they do not comply the particular internationally recognised HTML standard operating at the time of document creation. The current HTML standard at he time of drafting this patent specification may be found at http://www.w3c.org and http://www.w3c.org/TR/REC-htm140/.

The current standard for HTML documents insists that such documents be expressed as trees. Such a structure requires that each element of the document must be wholly contained by another element and, as a consequence, elements may not overlap. The experience of many indicates that it is easy to produce a document that superficially looks like HTML, but which in fact violates the tree-like hierarchical structures established by the HTML standard. Further, whilst human interpretation of such erroneous documents can often resolve ambiguities, there is often a mismatch between what makes sense according to the current standard, and that which the author of the HTML document actually intends.

Computer applications which read HTML approach such problems in a number of different ways. Some applications reject the bad HTML structure, thereby omitting the content or rendering the content in non-intuitive ways. Examples of these include "OPERA" and a number of smaller distribution Internet browsers which are preferred by some users for much more strict behaviours. Other applications try to match the user's likely intention despite of the strict errors contained in the HTML source. Examples of these include "Internet Explorer" (trade mark) manufactured by Microsoft Corporation, "Netscape Navigator" (trade mark) manufactured by Netscape Corporation, and "WebRecord" (trade mark) marketed by Canon Inc. In spite of the reasonable efforts the present inventors to determine how Internet Explorer and Netscape Navigator handle variations away from strict HTML, the present inventors have not been able to determine how those products perform in a manner so as to apparently resolve ambiguous or erroneous HTML.

A significant problem that arises from such non-compliance with the HTML standard is that there exist other languages and tools which interact with HTML documents, for example scripting language like JAVA script and styling languages like CSS2 (Cascading Style Sheet 2). Such tools expect that there is a strict tree structure in an HTML document and, as a consequence, often have no defined behaviour when interpreting a poorly formed HTML document. As a consequence an authored result cannot be guaranteed.

SUMMARY OF THE INVENTION

It is an object of the present invention to substantially overcome, or at least ameliorate, one or more disadvantages of existing arrangements.

According to a first aspect of the invention, there is provided a method of restructuring an input HTML document to comply with strict HTML, said method comprising the steps of:

(a) linearly traversing said input HTML document to create a hierarchical tree structure representation, said traversal maintaining a current insertion point for elements within said tree structure representation;

(b) during said traversal, identifying those elements of said input HTML document that violate strict HTML and, for each said identified element:

(b)(i) retracing said tree structure representation from said current insertion point to identify an further insertion point from which said identified element can depend, said retracing comprising noting each parent element of said identified element passed during said retracing;

(b)(ii) at said further insertion point, creating new elements in said tree structure representation corresponding to those said parent elements passed during said retracing, said new elements being created in reverse chronological order to that encountered during said retracing; and (b)(iii) appending said identified element to a terminal one of said new elements; and (c) converting said bee structure representation into an output HTML document.

According to another aspect of the invention, there is provided an apparatus for implementing the aforementioned methods. According to another aspect of the invention there is provided a computer program product including a computer readable medium having recorded thereon a computer program for implementing the method described above. Other aspects of the invention are also disclosed.

BRIEF DESCRIPTION OF THE DRAWINGS

A number of preferred embodiments of the present invention will now be described with reference to the drawings, in which:

FIG. 3 is a schematic block diagram of a general purpose computer upon which embodiments of the present invention can be practiced; and.

DETAILED DESCRIPTION INCLUDING BEST MODE

Figure 1:
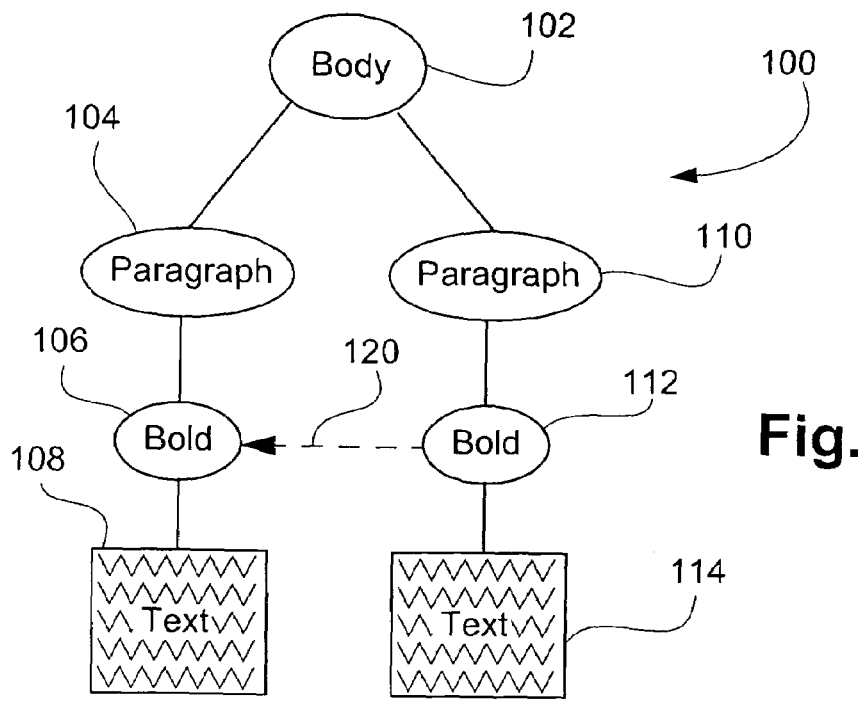
FIG. 1 depicts the tree structure of an HTML document.

The principles of the preferred embodiment described herein have general applicability to computer network browsing applications. However, for case of explanation, of the preferred embodiment is described with reference to HTML and to browsers that operate on the World Wide Web (WWW) and standards applicable thereto. However, it is not intended that the present invention be limited to the described method For example, the invention may have application in other standards environments, such as error correction and data recovery for XML applications.

Prior to describing the preferred embodiment, it is appropriate to review particular standards issues addressed thereby. For instance, elements in HTML have a starting tag and an ending tag. For example, with a strict HTML syntax, a document having two paragraphs of bold text may be represented in the following fashion indicated by Code A below.

Code A

```
<BODY>
<P><B>The first paragraph.</B></P>
<P><B>The second paragaph.</B></P>
</BODY>
```

Code A commences with an identifier as to the body of the particular element of code which is then followed by this first sub-tag P indicating the commencement of a paragraph. That tag is followed by a sub-tag B which effectively "switches on" a bold function for the following elements. Code A then recites the text content of the first paragraph of the document, which is concluded by a switch which turns off the bold, and a further switch which terminates the paragraph. The second paragraph is also commenced using a paragraph opening tag followed by a corresponding bold switch-on tag. The text of the second paragraph follows, then a bold switch-off tag and a paragraph terminator. The body is then terminated in an appropriate fashion.

Whilst Code A depicts strict HTML, the HTML standard permits some shortcuts or abbreviations. Code A may be abbreviated in the fashion represented below by Code B below.

Code B

```
<BODY>
<P><B>The first paragraph.</B>
<P><B>The second paragraph.</B>
</BODY>
```

It will be seen from Code B that each of the paragraph terminating tags has been omitted from the code. This is permitted by HTML because, in the case of the first paragraph, this is followed by paragraph opening tag. Since HTML does not permit the nesting of paragraphs, the standard readily resolves the opening of the new paragraph as requiring that the previous paragraph has closed. The same occurs with the body terminator.

A common error in HTML drafting is to omit some of the necessary tags required by strict interpretation. An example of this is seen in Code C where the bold turn-off tag in the first paragraph and the bold tags in the second paragraph have been omitted. Such an anomaly occurs because many authors consider such syntax to mean that the bold extends into the second paragraph.

Code C

```
<BODY>
<P><B>The first paragraph.
<P>The second paragraph.
</BODY>
```

The situation presented in Code C above leads to the impossible situation of one element (in this case, the bold) somehow sharing two parents. In this case, the bold element is started in the first paragraph and finished in the second paragraph This interpretation has both paragraph elements as parents to the bold element.

Because a paragraph in HTML cannot be nested inside another paragraph, the beginning of a new paragraph terminates the previous paragraph and, consequently, must terminate any elements that are children of the first paragraph.

There is another way this same type of error can occur in HTML documents, this being depicted in Code D below.

Code D

```
<BODY>
<P><B>The first paragraph.</P>
<P>The second paragraph.
</BODY>
```

In the case of Code D, the closing of the first paragraph is explicit but there still exists the ambiguous termination of the bold element.

In accordance with the preferred embodiment and the above examples, the HTML syntax errors identified above are resolved by noting any elements terminated by the start of the second paragraph and by creating child nodes (i.e., special nodes with no direct mapping to HTML) in the second paragraph that are links back to the initial elements in the first paragraph. In the case of Code D, since the closing of the first paragraph is explicit, the preferred embodiment uses the unexpected termination of the bold element as an instruction to create a link back to the next suitable containing element.

FIG. 1 illustrates the tree structure of the strict HTML of Code A discussed above. In FIG. 1, the body 102 is a root node of the expression tree forming the HTML document. The first paragraph 104 is depicted as a first child node and from which the bold switch 106 depends, followed by the text of the first paragraph 108. Similarly, the second paragraph is depicted as the second child 110 followed by its corresponding bold switch 112 and corresponding second paragraph text 114. In an HTML traversal of the tree 100, traversal commences at the root node 102 and then proceeds along a first branch to a first child 104. In order to progress to the terminal element of the first branch of the tree 100, one must pass through the bold switch 106 that operates on the text 108. In order to process the second branch, processing must reverse back along the first branch, switching off the bold 106 and terminating the first paragraph 104, before transiting the root node 102 to the second child node 110.

In the erroneous representation of Code C, the corresponding tree is incomplete in that the text 108 moves back directly to the paragraph 104 without transiting the bold 106. Under a strict HTML interpretation, and implementing limited error correction, such would provide for the second paragraph to be displayed in plain type, and not bold. In this particular example, one solution afforded by the preferred embodiment lies in recognizing the type of error, in order to give the second bold switch 112 a link 120 back to the first bold switch 106 in a form that provides for correct HTML interpretation. However, there is no standard HTML representation for such a link. An alternative is to copy the desired structure from the complementary parent node.

The preferred embodiment addresses these issues by reconstructing the tree structure of the HTML document, as the document is linearly read. Specifically, in such a reconstruction, each tag in a node does something to the tree, for example to start a node or end a node. Each node is created as being a child of the previous node. Errors occur when nesting within paragraphs is incomplete. A solution is that, as one traverses through the tree, to create a new node and to remember what has been traversed so that one can then trace back through the tree to correct the remaining nodes. As a consequence of such an arrangement, as represented in FIG. 1, the erroneous HTML may be corrected by creating an intuitive link 120 from the second bold switch 112 back to the first bold switch 106.

A specific example of such a solution is shown in FIGS. 2A to 2F in relation to the erroneous code of Code C depicted above. The example is also described with reference to the method 400 shown in the flow chart of FIGS. 4A to 4D.

Figure 2A:
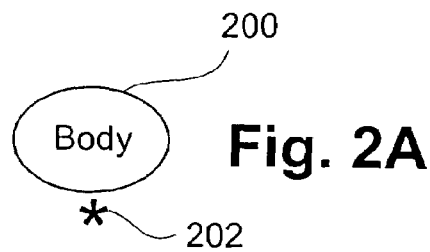
FIGS. 2A to 2F depict various processing stages for correcting poorly formed HTML.
Figure 4A:
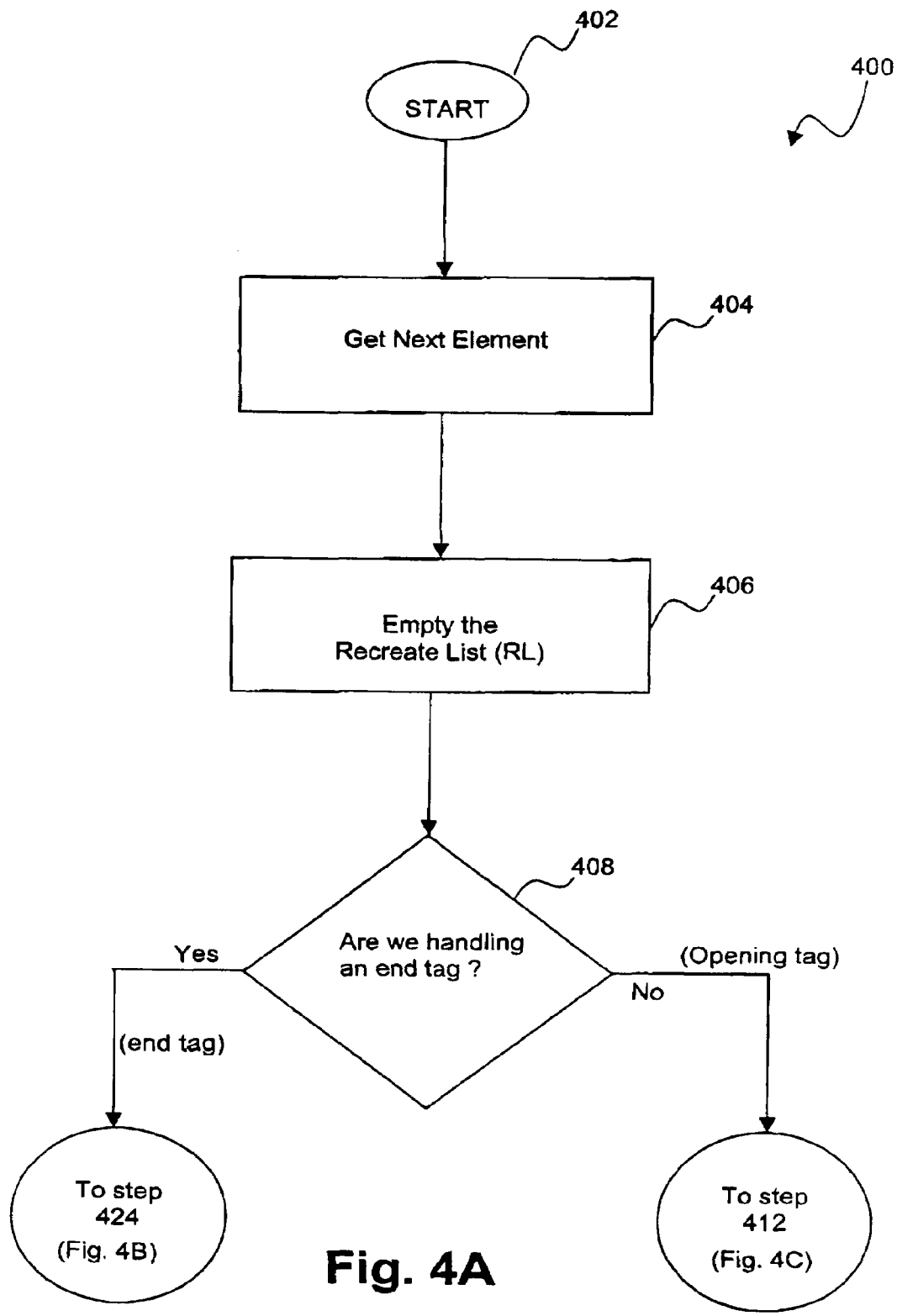
FIGS. 4A to 4D are flowcharts for the various preferred processing stages.
Figure 4B:
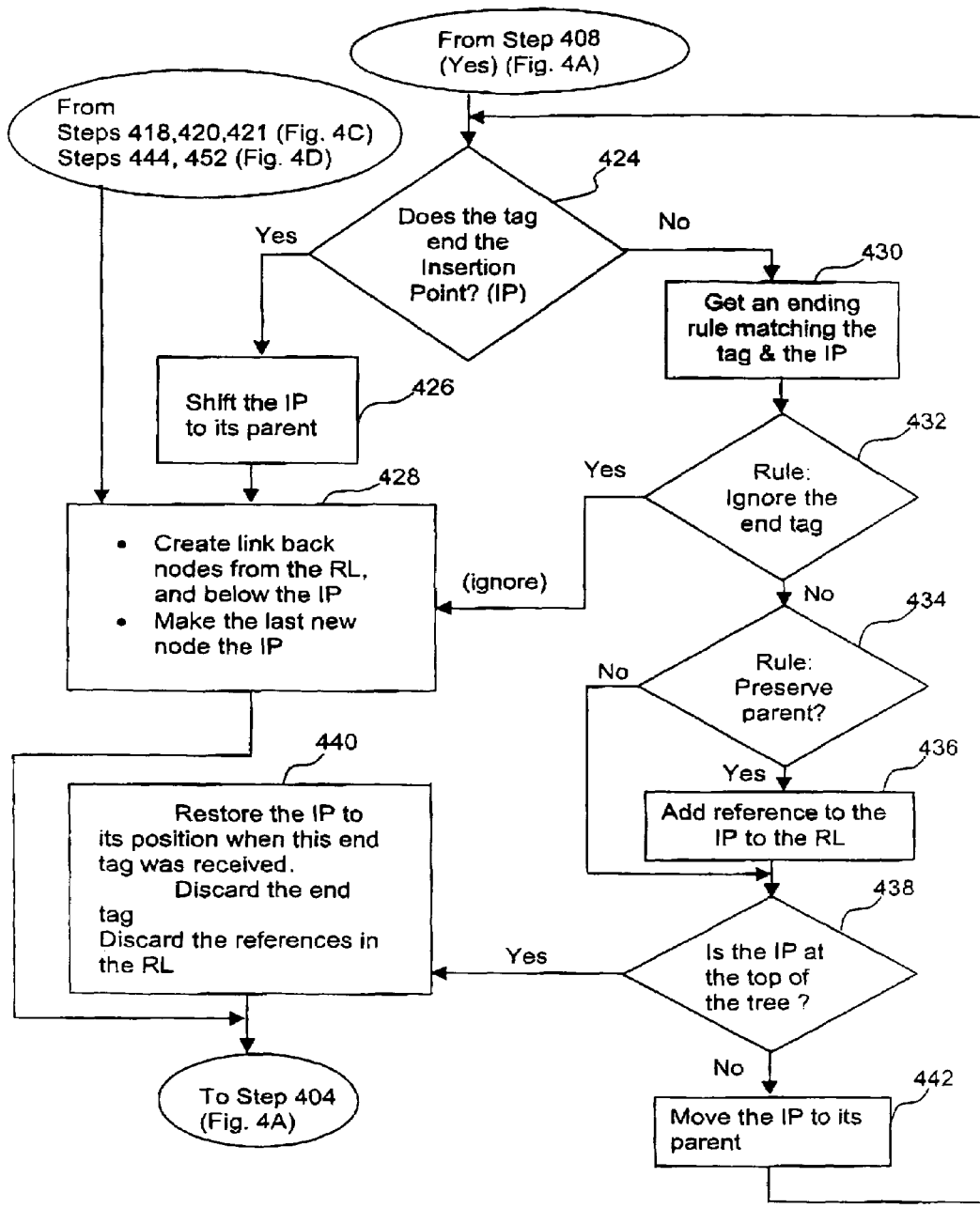
Figure 4C:
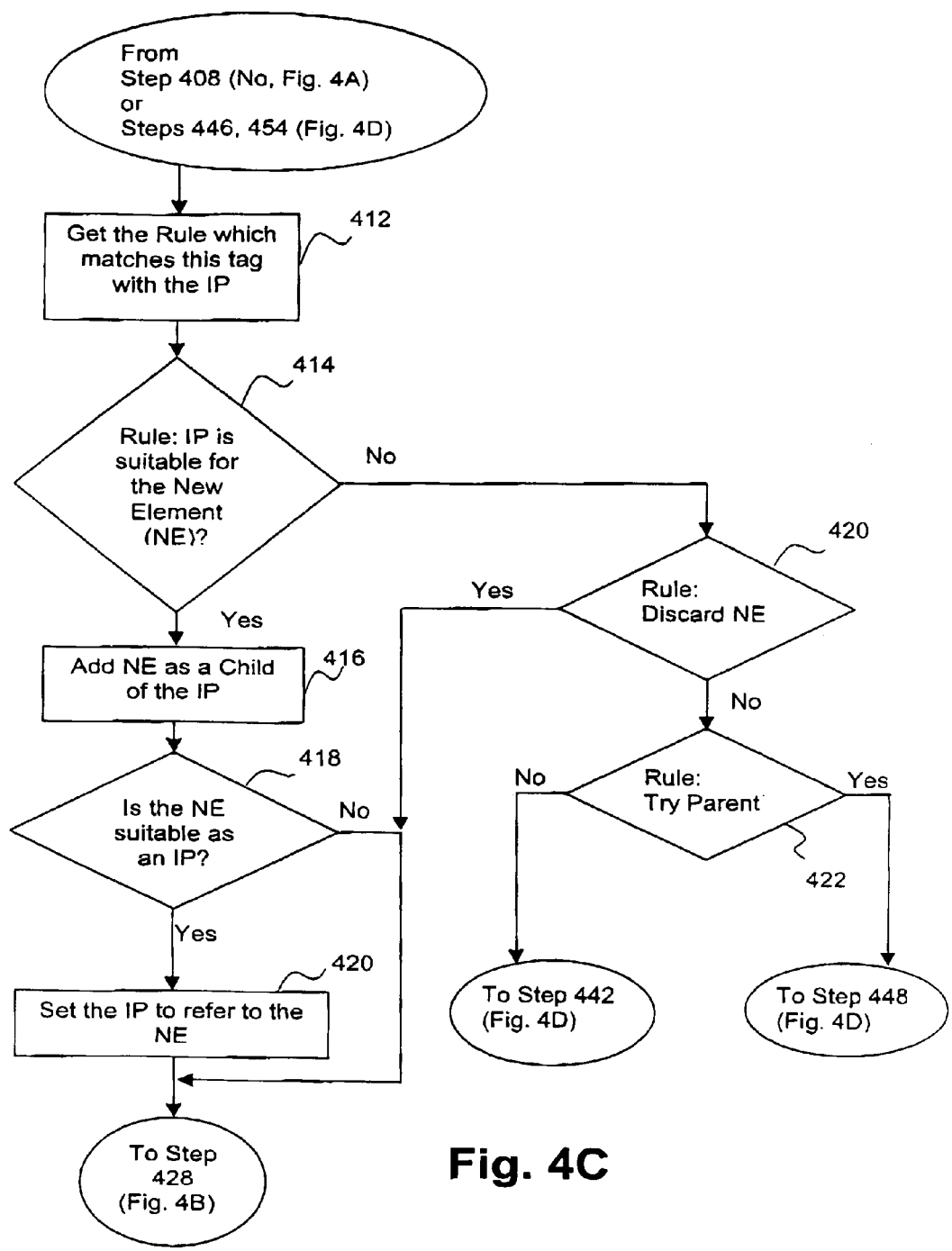
Figure 4D:
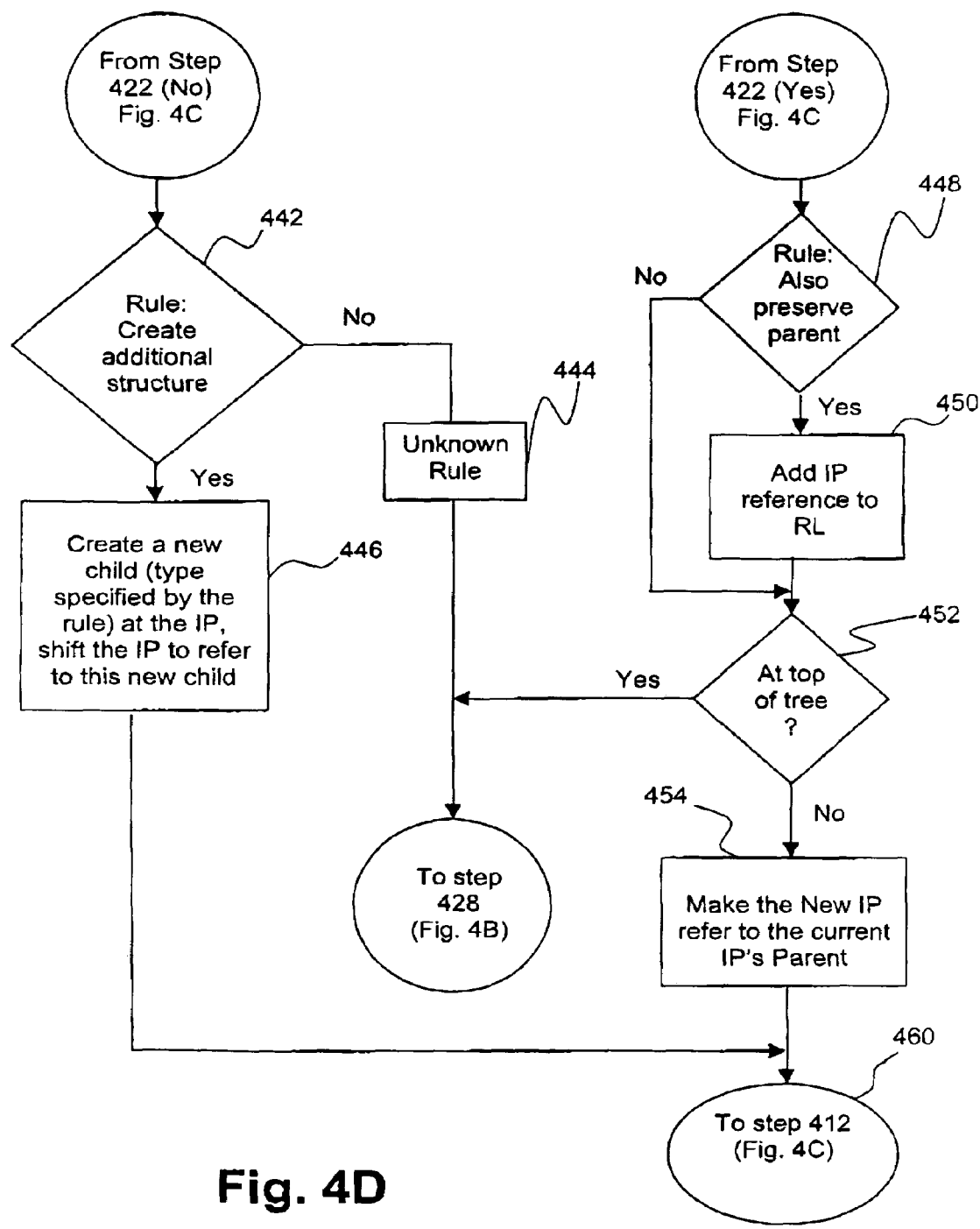

FIG. 2A shows the inception of the tree structure corresponding to step 402 of FIG. 4A where a minimal tree is formed comprising a root node 200 identified by the tag "body". Associated with the root node 200 at step 402 is a corresponding insertion point 202 indicating a location at which a child node is to depend. The creation of the tree structure arises from a process such as an HTML parser which provides a stream of new elements. A new element in this regard is a new node which may be added to the tree corresponding to a tag from the input stream. These may include opening tags or ending tags, noting that text functions as an opening tag for the purposes of the described method.

Figure 2B:
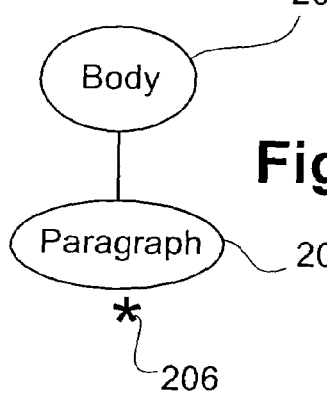

The next step 404 in the method 400 is the fetching of a new, or next, element (NE), which is followed by step 406 where a recreate list (RL) is emptied in anticipation of an insertion process for the element into the tree. Step 408 follows which performs a test to determine if an "end tag" is being handled. This is determined directly from the HTML code. Code C here includes an opening tag <P> and step 408 returns "No". Control then passes to step 412 of FIG. 4C. Step 412 commences a process which determines an insertion rule that matches the opening tag with the insertion point (IP) 202 of the tree. The process includes step 414 which assesses whether the insertion point 202 is suitable for a new element. Ink Code C, the new element is a paragraph which is determined as suitable for appending to the body node 200 and hence step 414 is satisfied. Step 416 follows and the paragraph 204 is appended to the tree as a child node at the insertion point 202. This is seen in FIG. 2B. Step 418 (FIG. 4C) follows to determine if the new element just inserted (ie. the paragraph 204) is suitable for use as in insertion point. If so, as in the case of the paragraph 204, step 420 is implemented where the insertion point 206 is set to refer to the new element (ie. the paragraph 204). If the new element is not suitable as an insertion point, step 420 is bypassed and control passes to step 428 of FIG. 4B. Step 428 creates link-back nodes from references in the recreate list and below the insertion point 206 and makes the last new node the current insertion point Control then returns t step 404 to get the next element.

Figure 2C:
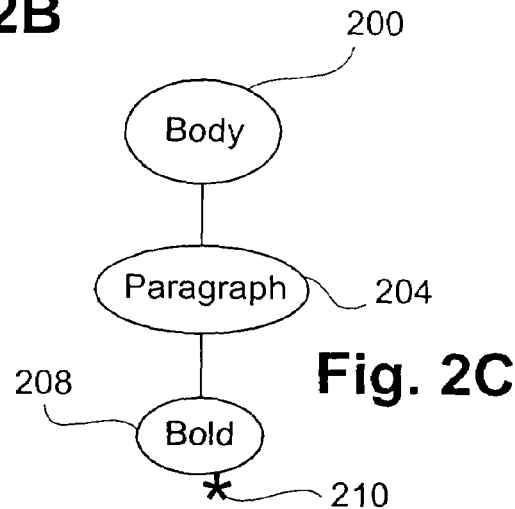

FIG. 2C follows in a similar fashion whereby the next node 208 corresponding to the bold switch is appended to the first child node 204, and a new insertion point 210 created.

Figures 2D, 2E, 2F:
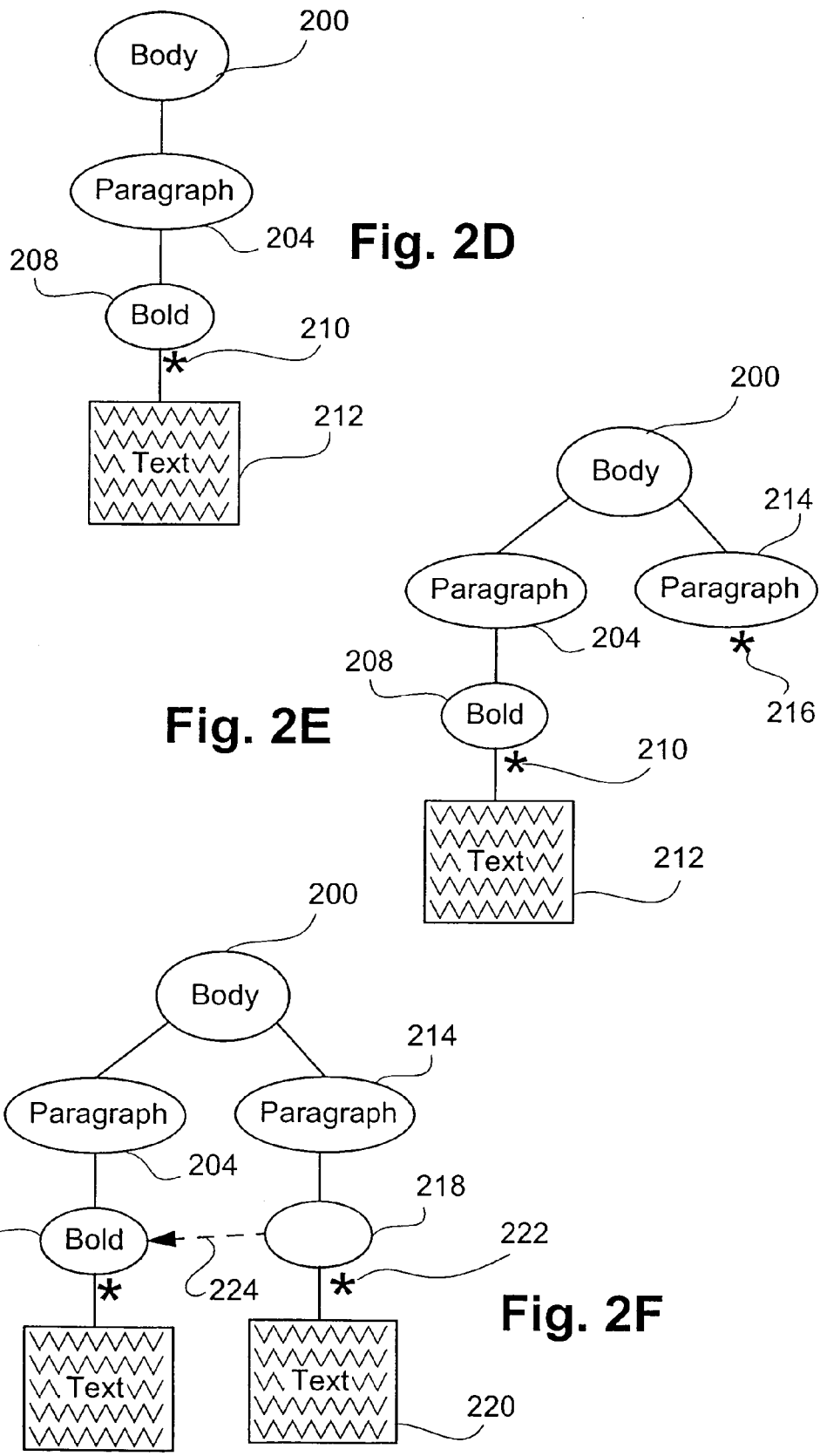

FIG. 2D illustrates the inclusion of text 212 of the first paragraph and depending from the insertion point 210. It is noted in this regard that in FIG. 2D, the insertion point 210 remains depending from the bold node 208 because, under the HTML standard, text cannot be conceived as a container of other tags (ie. additional nodes in the tree). In this regard, the text is the specific content of the document as opposed to something that marks-up the manner in which the content is presented. In this regard, the method steps of FIG. 4A and 4C described above are followed again until step 418 is reached, returning a "No". Step 428 then follows which, since the paragraph is unsuitable as an insertion point, retains the bold node 208 as the current insertion point 210.

Control again returns to steps 404 and 406 and a further parsing of the Code C reveals an opening tag for the second paragraph. If the second paragraph of Code C were to be added at the current insertion point 210, such would violate the HTML rule that paragraphs cannot be nested within each other. According to the preferred embodiment, the insertion point 210 is retraced back along the tree to a point where the new paragraph can be appended. Specifically, in tracing back, which occurs within a loop between steps 460 (FIG. 4D) and 412 (FIG. 4C) it is noted that the bold node 208 is to be recreated, resulting from the operation of step 448 and 450 (to be described). The insertion point then passes to the paragraph 204. Traversal then returns to the root node 200 where it is determined that a new paragraph may be appended thereto (ie. steps 412 and 414). The new instruction for the creation of the second paragraph is shown in FIG. 2E, with the creation of paragraph 214 appended to the root node 200 (ie. step 416). A new insertion point 216 is created (ie. steps 419 and 420).

The various corrections relating to the described examples may be summarised in tabular form below, where the bracketed numerals represent steps in the method 400 at which the relevant determination is made.

TABLE 1

End Tag Rules

| | | New Tag (ending tag) | | |
|---|---|---|---|---|
| | | Body | Bold | Paragraph |
| Insertion Point | Body | Discard (432) | Discard (432) | Discard (432) |
| | Bold | Discard (432) | Yes (424) | Preserve Parent (434) |
| | Paragraph | Discard (432) | Discard (432) | Yes (424) |

TABLE 2

New Tag Rules

|  |  | New Tag (NE) | | | |
|---|---|---|---|---|---|
|  |  | Body | Bold | Paragraph | Text |
| Insertion Point | Body | Discard (421) | Parent (442) | Yes (414) | Parent (442) |
|  | Bold | Yes (422) & (448) | Yes (414) | No, but recreate (422 & 448) | Yes (414) |
|  | Paragraph | Yes (422) & (448) | Yes (414) | No (422 & 448) | Yes (414) |

Further rules may be developed which seek to relate each individual HTML tag with each other HTML tag, the rules acting to perform the correction function desired for the particular application. Where appropriate or desired, certain rules may be classified into groups and any exceptions noted.

This process occurs via steps 408, 412 and 414, the latter returning a "No", since one paragraph cannot be a child of another. Step 421 (FIG. 4C) is then performed to determine if the new element may be discarded. This may occur in a few instances of text and related tags in bad spots in tables and controls. For example, tags such as BOLD and ITALIC only have relevance to text content and not to other content, such as tables. In the present case, the new element will not be discarded and step 422 follows where the parent node of the current node, identified by the insertion point is tested. If the parent is valid, as in the present case, the test of step 448 is then performed. In the present case the rule tables above state that the parent may be preserved. Step 450 then adds a reference to the insertion point 210 to the recreate list. Step 452 assesses whether the top of the tree has been reached. In the present example, this is not the case and step 454 which follows makes a new insertion point to the parent of the node (ie. the paragraph 204 of FIG. 2D) These steps are then repeated until the insertion point is retraced back to the root note, in this case the body node 200. When this occurs, step 414 can then determine that the insertion point is suitable for the new element and, as before, the second paragraph 214 is appended to the body node and the insertion point updated to 216, giving the configuration of FIG. 2E.

The next step in the processing is to recreate each of the elements that were passed in the first branch of the tree prior to the new instruction being added. The result is seen in FIG. 2F where, appended to the paragraph 214, is an element 218 linking to the bold element 208 having been traversed in the first branch of the tree. The insertion point is updated to the point 222 at which text of the second paragraph 220 may be appended.

This process may be understood with reference again to the flowcharts, where further parsing of Code C reveals the text content of the second paragraph as the next element. Steps 404, 408 and 412 are performed on further parsing of Code C, in this case again interpreting the text as an opening tag. Steps 414, 416 and 418 follow as before. With the insertion point stored in the recreation list remaining appended to the bold 210 (from step 450 discussed above), step 420 is then performed followed by step 428 where a link-back node 218 is then established from the recreate list and depending from the existing insertion point 216. The node 218 forms a link 224 seen in FIG. 2F. Because the link points to the bold node 208, the link-back node 218 thus operates as a bold node. This provides for the insertion point to then be updated to be the point 222 associated with the link-back node 218 according to step 428.

Further parsing of Code C reveals the end tag </BODY>, and hence step 408 is followed by step 424. In this case, the end tag relates to BODY and does not end the insertion point attached to the second paragraph. Hence step 430 follows to determine an ending rule to match the tag and the insertion point. Step 432 proposes a rule which ignores the end tag. Table nodes often absorb end tags this way aid this limits the scope of an end tag, this being performed for historical and/or arbitrary reasons arising from the somewhat haphazard development of HTML. In the present case, such is not appropriate and step 434 follows where the parent node may be preserved. This can be performed and step 436 adds a reference to the insertion point. Step 438 which causes the insertion point to be retraced back to the body node 200 thereby, when the top of the tree is reached, step 440 is performed resulting in the discarding of the end tag. This means in this case that content after the end body tag can still be added, in the case of a deliberate error putting content after an end of body tag. In the preferred embodiment, it is important that the extra node link back to the original node, rather than simply being another node of the same type, for example copied from the original node. The reason for this is that it is possible for languages to associate information with nodes according to the structure of the HTML document, this being a more elegant and computationally flexible solution than the "brute-force" method of copying sections of code. In this regard, Code E below incorporates a component of CSS2 code that sets the colour of a bold element that is the child of a paragraph that is the first child of its parent.

Code E

```
<HEAD>
<STYLE>                         }
P:first-child B{color:red}      } CSS2 code
</STYLE>                        }
<BODY>
<P><B>The first paragraph.
<P>The second paragraph.
</BODY>
```

The purpose of Code E will be appreciated is to colour the paragraphs with the colour red. The commonly expected behaviour of such code, given that it is represented by incorrect HTML, is that the second paragraph would thus also be coloured red. If the structural correction of the preferred embodiment had been the equivalent of putting a fully independent bold element in the second paragraph, then that second bold element would not have matched the selector for the rule which applied the colour of red. The preferred method for implementing such presentation is to work forward through the original HTML source document constructing the expression tree as the traversal proceeds. A notion of the current insertion point into the tree is maintained as the tree is formed. The input of the tree is broken into two types of instructions, firstly those that create a new node (either because of the new element tag or text content, or secondly to end a node, because of the existence of closing tags. When a new element is attempted to be added to be added to the tree, the new element is tested to determine if it is of a type that is permitted to be nested at the current insertion point. If the new element is acceptable, then the new element is added to the tree and a new insertion point created unless the element is of a type that must always be a leaf node in the tree. If it is not acceptable to add the new element at the current insertion point, the preferred embodiment works its way back through the parent nodes noting those parent nodes which are required to be recreated as link back nodes in the new node. If an acceptable parent node is identified, the new element node is created and the link back nodes are added to the new element node. If an ending tag is encountered, the tree is traversed back through the ancestors from the insertion point noting in order those nodes need to be linked back. This proceeds until an element is identified that requires termination. The parent of the terminated element then made to be the new insertion point to which the new link back nodes are added. As each link back node is created, that node becomes an insertion point in its own right. Accordingly, if there are any multiple link back nodes, each would be created as a child of the previous link back in terms.

Returning to the CSS2 code indicated in Code E above, and the method steps depicted in FIGS. 2A to 2F, two alternatives arise for the appropriate processing of the CSS2 information. The first alternative is to do a first pass on the tree to obtain all CSS2 information, being those which require the fetching of additional documents to get the CSS2 information. This information is retained in memory so that each time a node is placed, a check can be determined as to whether the CSS information applies and if so, it is then applied to the node. Such an alternative however will not work for dynamic HTML. A solution to this is a further alternative where, as in the step depicted by FIG. 2F, a vector is formed which links back between the second bold node 218 to the original bold node 208 from which it was created so that the CSS information can be copied from the original node but link being shown in FIG. 2F as the link 224.

Figure 3:
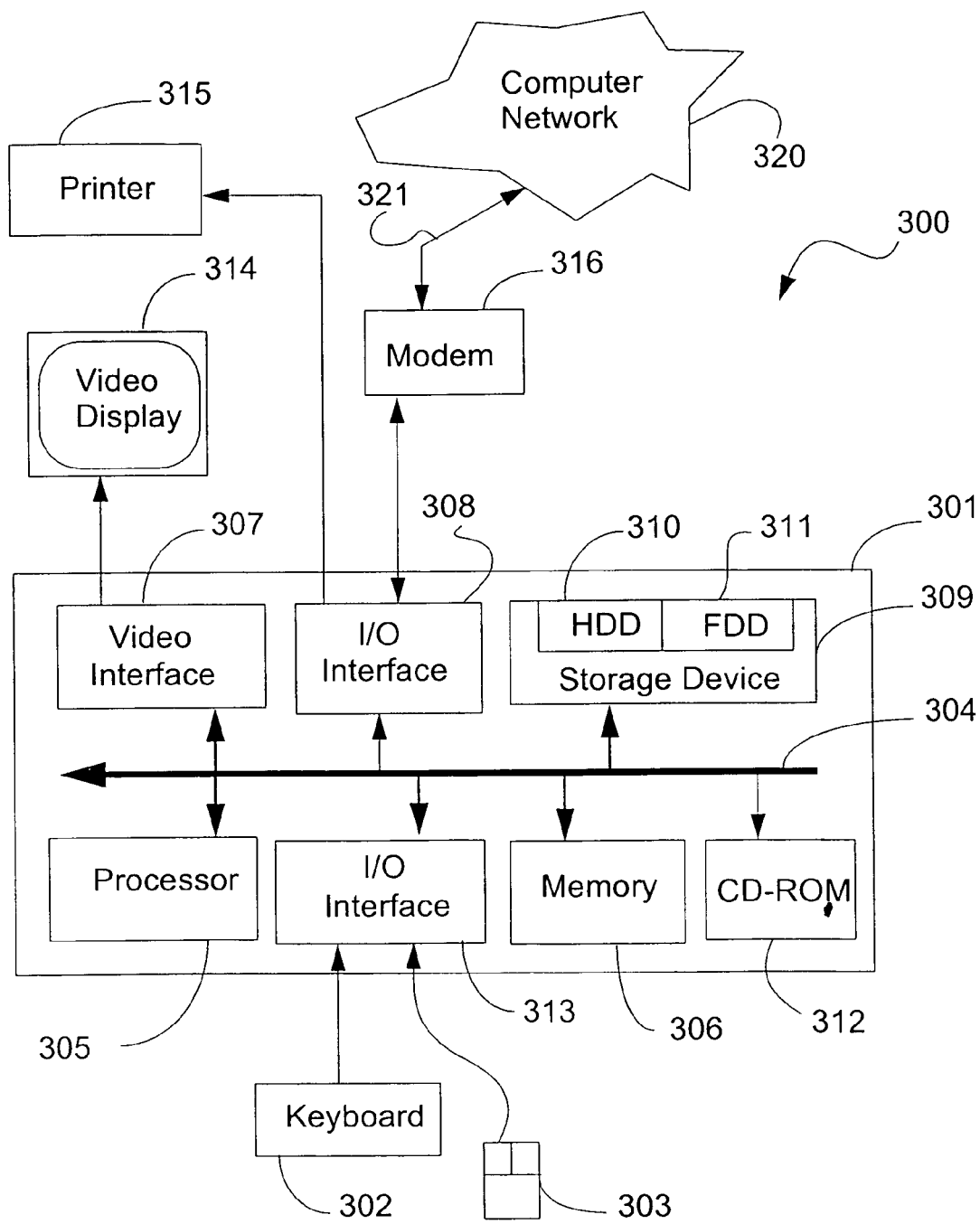

The restructuring method of FIGS. 2A to 2F and generally described herein are preferably practiced using a conventional general-purpose computer system 300, such as that shown in FIG. 3 wherein the restructuring processes are implemented as software, such as an application program executing within the computer system 300. In particular, the steps of the restructuring method are effected by instructions in the software that are carried out by the computer. The software may be divided into two separate parts; one part for carrying out the restructuring methods; and another part to manage the user interface between the latter and the user. The software may be stored in a computer readable medium, including the storage devices described below, for example. The software is loaded into the computer from the computer readable medium, and then executed by the computer. A computer readable medium having such software or computer program recorded on it is a computer program product. The use of the computer program product in the computer preferably effects an advantageous apparatus for restructuring HTML documents in accordance with the embodiments of the invention.

The computer system 300 comprises a computer module 301, input devices such as a keyboard 302 and mouse 303, output devices including a printer 315 and a display device 314. A Modulator-Demodulator (Modem) transceiver device 316 is used by the computer module 301 for communicating to and from a communications network 320, for example connectable via a telephone line 321 or other functional medium. The modem 316 can be used to obtain access to the Internet, and other network systems, such as a Local Area Network (LAN) or a Wide Area Network (WAN).

The computer module 301 typically includes at least one processor unit 305, a memory unit 306, for example formed from semiconductor random access memory (RAM) and read only memory (ROM), input/output (I/O) interfaces including a video interface 307, and an I/O interface 313 for the keyboard 302 and mouse 303 and optionally a joystick (not illustrated), and an interface 308 for the modem 316. A storage device 309 is provided and typically includes a hard disk drive 310 and a floppy disk drive 311. A magnetic tape drive (not illustrated) may also be used. A CD-ROM drive 312 is typically provided as a non-volatile source of data. The components 305 to 313 of the computer module 301, typically communicate via an interconnected bus 304 and in a manner which results in a conventional mode of operation of the computer system 300 known to those in the relevant art. Examples of computers on which the embodiments can be practised include IBM-PC's and compatibles, Sun Sparcstations or alike computer systems evolved therefrom.

Typically, the application program of the preferred embodiment is resident on the hard disk drive 310 and road and controlled in its execution by the processor 305. Intermediate storage of the program and any data fetched from the network 320 may be accomplished using the semiconductor memory 306, possibly in concert with the hard disk drive 310. Reconstruction of the tree according to the preferred embodiment may be performed in the memory 306. In some instances, the application program may be supplied to the user encoded on a CD-ROM or floppy disk and read via the corresponding drive 312 or 311, or alternatively may be read by the user from the network 320 via the modem device 316. Still further, the software can also be loaded into the computer system 300 from other computer readable medium including magnetic tape, a ROM or integrated circuit, a magneto-optical disk, a radio or infra-red transmission channel between the computer module 301 and another device, a computer readable card such as a PCMCIA card, and the Internet and Intranets including e-mail transmissions and information recorded on Websites and the like. The foregoing is merely exemplary of relevant computer readable mediums. Other computer readable mediums may be practiced without departing from the scope and spirit of the invention.

The restructuring methods described above permit poorly formed HTML to be interpreted restructured into a syntax corresponding to the HTML standard. As a consequence, that restructured syntax may then be interpreted by a browsing application thereby enabling consistent reproduction according to the HTML standard.

Although examples described above in relation to the preferred embodiment relate to text, paragraphs, and bold operators, similarly issues can arise through the interpretation of other switches, content, and the like which prevail the HTML standards. This may also include the provisional of italicised text, incorporation of images and the presentation and images in tables and the like.

INDUSTRIAL APPLICABILITY

It is apparent from the above that the embodiment(s) of the invention are applicable to the computer and data processing industries, and in particular to computer network browsing software applications where the application may be exposed to a wide variety of documents, each purporting to coincide with a particular standard, but not necessarily conforming to that standard.

The foregoing describes only one embodiment of the present invention, and modifications and/or changes can be made thereto without departing from the scope and spirit of the invention, the embodiment being illustrative and not restrictive.

The invention claimed is:

1. A computer-implemented method of restructuring an input HTML document to comply with strict HTML, said method comprising the steps of:
    (a) linearly traversing the input HTML document to create a hierarchical tree structure representation, the traversal maintaining a current insertion point for elements within the tree structure representation;
    (b) during the traversal, identifying elements of the input HTML document that violate strict HTML, and, for each identified element:
        (b)(I) retracing the tree structure representation from the current insertion point to identify a further insertion point from which the identified element can depend, the retracing comprising noting one or more elements passed during the retracing;
        (b)(ii) appending the identified element at the further insertion point;
        (b)(iii) creating new elements in the tree structure representation corresponding to the noted one or more elements passed during the retracing, the new elements being created in reverse chronological order to an order in which the noted one or more elements were passed during the retracing; and
        (b)(iv) appending each new element to the identified element as a link back element, wherein the link back element comprises a link to a corresponding noted element of the noted one or more elements; and
    (c) converting the tree structure representation into an output HTML document.

2. The method according to claim 1, wherein each link comprises a vector.

3. The method according to claim 1, wherein step (b)(iv) comprises copying a syntax of the first noted element of the noted one or more elements passed during the retracing to the appended identified element.

4. The method according to claim 1, wherein
    one or more of the elements comprises information associated therewith, and
    said method further comprises, before step (a), the steps of:
        performing an initial pass of the input HTML document to identify the elements having the associated information, and
        maintaining a record of each such element and the corresponding associated information whereby each time the element is placed in the tree structure representation, the corresponding associated information is associated therewith.

5. The method according to claim 1, further comprising the step of:
    (d) reproducing the output HTML document.

6. The method according to claim 5, wherein the output HTML document is reproduced using a video display.

7. The method according to claim 5, wherein the output HTML document is reproduced using a printer.

8. An apparatus for restructuring an input HTML document to comply with strict HTML, said apparatus comprising:
    means for linearly traversing the input HTML document to create a hierarchical tree structure representation, the traversal maintaining a current insertion point for elements within the tree structure representation;
    means for identifying, during the traversal, an element of the input HTML document that violates strict HTML;
    means for retracing the tree structure representation from the current insertion point to identify a further insertion point from which the identified element can depend, the retracing comprising noting one or more elements passed during the retracing;
    means for appending the identified element, at the further insertion point;
    means for creating at least one new element in the tree structure representation corresponding to the noted one or more elements passed during the retracing, the new elements being created in reverse chronological order to an order in which the noted one or more elements were passed during the retracing;
    means for appending each new element to the identified element as a link back element, wherein the link back element comprises a link to a corresponding noted element of the noted one or more elements; and
    means for convening the tree structure representation into an output HTML document.

9. The apparatus according to claim 8, wherein each link comprises a vector.

10. The apparatus according to claim 8, wherein said means for appending each new element copies a syntax of the first noted element of the noted one or more elements passed during the retracing to the appended identified element.

11. The apparatus according to claim 8, wherein
    one or more of the elements comprises information associated therewith, and
    said apparatus further comprises:
        means for performing an initial pass of the input HTML document to identify the elements having the associated information, and
        means for maintaining a record of each such element and the corresponding associated information whereby each time the element is placed in the tree structure representation, the corresponding associated information is associated therewith.

12. The apparatus according to claim 8, further comprising means for reproducing the output HTML document.

13. The apparatus according to claim 12, wherein said means for reproducing comprises a video display.

14. The apparatus according to claim 12, wherein said means for reproducing comprises a printer.

15. A computer-readable medium, having a program recorded thereon, wherein the program is configured to make a computer execute a procedure to restructure an input HTML document to comply with strict HTML, said program comprising:
    code for linearly traversing the input HTML document to create a hierarchical tree structure representation, the traversal maintaining a current insertion point for elements within the tree structure representation;
    code for, during the traversing of the input HTML document, identifying an element of the input HTML document that violates strict HTML;
    code for retracing the tree structure representation from the current insertion point to identify a further insertion point from which the identified element can depend, the retracing comprising noting one or more elements passed during the retracing;
    code for appending the identified element at the further insertion point;
    code for creating new elements in the tree structure representation corresponding to the noted one or more elements passed during the retracing, the new elements being created in reverse chronological order to an order in which the noted one or more elements were passed during the retracing;

code for appending each new element to the identified element as a link back element, wherein the link back element comprises a link to a corresponding noted element of the noted one or more elements; and code for converting the tree structure representation into an output HTML document.

16. The computer-readable medium according to claim 15, wherein each link comprises a vector.

17. The computer-readable medium according to claim 15, wherein the code for appending each new element comprises code for copying a syntax of the first noted element of the noted one or more elements encountered during the retracing to the appended identified element.

18. The computer-readable medium according to claim 15, wherein one or more of the elements comprises information associated therewith, and said program further comprises:

code for performing an initial pass of the input HTML document to identify the elements having the associated information, and code for maintaining a record of each such element and the corresponding associated information whereby each time the element is placed in the tree structure representation, the corresponding associated information is associated therewith.

19. The computer-readable medium according to claim 15, said program further comprising code for reproducing the output HTML document.

20. The computer-readable medium according to claim 19, wherein the output HTML document is reproduced using a video display.

21. The computer-readable medium according to claim 19, wherein the output HTML document is reproduced using a printer.

* * * * *

UNITED STATES PATENT AND TRADEMARK OFFICE
CERTIFICATE OF CORRECTION

| | |
|---|---|
| PATENT NO. | : 7,058,884 B2 |
| APPLICATION NO. | : 09/737589 |
| DATED | : June 6, 2006 |
| INVENTOR(S) | : Julian Benjamin Kelsey |

It is certified that error appears in the above-identified patent and that said Letters Patent is hereby corrected as shown below:

TITLE PAGE

[57] ABSTRACT

Line 10, "an" should read --a--.
      Line 19, "append" should read --appended--.

COLUMN 2

Line 2, "of" should be deleted.
      Line 8, "the" should read --of the--.
      Line 41, "an" should read --a--.
      Line 53, "bee" should read --tree--.

COLUMN 3

Line 14, "of" (second occurrence) should be deleted.
      Line 20, "method" should read --method.--.

COLUMN 6

Line 3, "in" should read --an--.

COLUMN 7

Line 40, "note," should read --node,--.

COLUMN 8

Line 16, "which" should be deleted.
      Line 17, "node 200" should read --node 200.--.
      Line 18, "thereby," should read --Thereby,--.
      Line 47, "E will be appreciated" should read --E, as will be appreciated,--.
      Line 62, "node (either" should read --node, either--.
      Line 64, "to be added" should be deleted.

UNITED STATES PATENT AND TRADEMARK OFFICE
CERTIFICATE OF CORRECTION

PATENT NO. : 7,058,884 B2
APPLICATION NO. : 09/737589
DATED : June 6, 2006
INVENTOR(S) : Julian Benjamin Kelsey It is certified that error appears in the above-identified patent and that said Letters Patent is hereby corrected as shown below:

COLUMN 9

Line 12, "need" should read --that need--.
    Line 35, "node but link being" should read --node. The link is--.

COLUMN 10

Line 20, "road" should read --read--.
    Line 44, "interpreted" should read --interpreted and--.
    Line 52, "prevail" should read --utilize--.
    Line 53, "provisional" should read --provision--.

COLUMN 11

Line 15, "(b)(I)" should read --(b)(i)--.

Signed and Sealed this

Twentieth Day of February, 2007

JON W. DUDAS
*Director of the United States Patent and Trademark Office*